United States Patent [19]

Hillmann

[11] 4,236,616
[45] Dec. 2, 1980

[54] CURRENT COLLECTOR SHOE
[75] Inventor: Willi Hillmann, Kamen, Fed. Rep. of Germany
[73] Assignee: Paul Vahle KG, Kamen, Fed. Rep. of Germany
[21] Appl. No.: 58,536
[22] Filed: Jul. 18, 1979
[30] Foreign Application Priority Data
Jul. 20, 1978 [DE] Fed. Rep. of Germany ....... 2831882
[51] Int. Cl.$^3$ ................................................ B60L 5/06
[52] U.S. Cl. ..................................... 191/59.1; 339/36
[58] Field of Search ............. 191/59.1; 339/20, 21 R, 339/36, 22 T; 310/239, 242, 245, 247

[56] References Cited
U.S. PATENT DOCUMENTS
2,568,480 9/1951 Barkis .............................. 191/59.1 X
2,921,146 1/1960 Ericson ............................ 191/59.1 X Primary Examiner—Richard A. Schacher
Attorney, Agent, or Firm—Max Fogiel

[57] ABSTRACT

A current collector shoe traveling along a multipole slide wire with sliding contacts projecting from the sides and spring-mounted in the shoe. Breakouts extend between the lengthwise sides for cassettes insertable from either side, with the sliding contacts being spring-mounted in the cassettes. The cassettes may be made of non-conducting material, and a brass sleeve may be inserted between the cassettes and the sliding contacts. The cassettes may be detachably detented in the collector shoe and have projections on their face side to contact the collector shoe from the outside during installation. Each sliding contact may be engaged by a compression spring and connected rigidly to it, with a Z-shaped sheet metal member having a leg fastened to a free end of the spring and contacting the cassette bottom, with the other leg fastened to the collector shoe on the outside. The compression spring may be a flat strip spring. The terminals for the supply cable cores are at the level of the breakouts and the outside leg of the sheet metal member is fixed by the screw which is part of the terminal. Covers for the cable ducts may be detachably fastened to the collector shoe.

12 Claims, 9 Drawing Figures

CURRENT COLLECTOR SHOE

BACKGROUND OF THE INVENTION

The present invention relates to a current collector shoe traveling along a multipole slide wire with sliding contacts projecting from the lengthwise sides and spring-supported in the shoe, with the contacts touching the conduits of the slide wire.

Such current collector shoes are used in conjunction with associated slide wires for supplying power to traveling power loads.

With known current collector shoes, the association of the sliding contacts with the shoe is provided by recesses provided in the shoe. This requires special arrangements for four- and six-pole installations, and for various conduit arrangements.

Accordingly, it is an object of the present invention to provide current collector shoes so that one type of shoe may serve installations with different numbers of poles and various conduit arrangements.

Another object of the present invention is to provide an arrangement of the foregoing character which is substantially simple in construction and may be economically fabricated.

A further object of the present invention is to provide a current collector shoe, as described, which may be readily maintained in service and which has a substantially long operating life.

SUMMARY OF THE INVENTION

The objects of the present invention are achieved by providing in a current collector shoe, as described, breakouts extending between the lengthwise sides of the shoe into which cassettes may be inserted at will from either side. The sliding contacts are spring supported in these cassettes and the shoe is designed from the outset for a higher number of poles.

The current collector shoe according to the present invention can be adapted to the slide wire installation and equipped at will with sliding contacts and thus makes unnecessary special manufacture of such current collector shoes for different slide wire installations. An association of the sliding contacts with the collector shoe can be made to ensure substantially straight running of the shoe.

Cassettes of non-conducting material ensure the required minimum surface-leakage path in a simple manner. The insertion of a brass sleeve ensures the unimpaired displacement of the sliding contact in the cassette.

It is expedient to detachably fasten the cassettes by positive locking.

A special embodiment provides a compression spring engaging the contact and fixedly connected to the contact for the elastic support of the sliding contacts. The free end of the spring is fastened to the leg, resting against the cassette bottom, of a Z-shaped sheet metal member, whose opposite leg is fastened from the outside and is in contact with the shoe. The compression spring is a flat strip spring. With this design, a projection, formed on the cassette on the side facing away from the bottom and contacting the collector shoe when installed from the outside is sufficient for fixing the cassette. The leg of the sheet metal member contacting the collector shoe from the outside can be fixed by means of the screw which is part of the terminals located at the level of the breakouts in the shoe. These terminals are for the cores of the supply cable. Then the cassette is also secured.

A further embodiment provides detachably mounted covers for the cable run and if necessary also for the terminals and the legs, contacting the terminals, of the sheet metal members engaging the sliding contacts and the compression springs, respectively.

The function of the so-called guide and pickup member usually placed on such collector shoes can be assumed by covers projecting downward beyond the collector shoe. This provides the possibility of using materials, as a rule synthetic materials, meeting the requirements for the collector shoe proper and for the guide and pickup member. By inserting screws in the shell-like covers, they can be fixed to the collector shoe. Projections formed on the covers and engaging recesses in the collector shoe may determine the location of the cover on the collector shoe.

The collector shoes may be equipped with rollers or with slide bars, as desired.

By combining two or more superposed base members, the system can be extended to 8, 12 or a higher number of poles.

Of course, a grounding by a ground strap in conjunction with an associated sliding contact may be provided. A sliding contact to be inserted in the collector shoe in conjunction with an overhead ground strap comes to mind.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
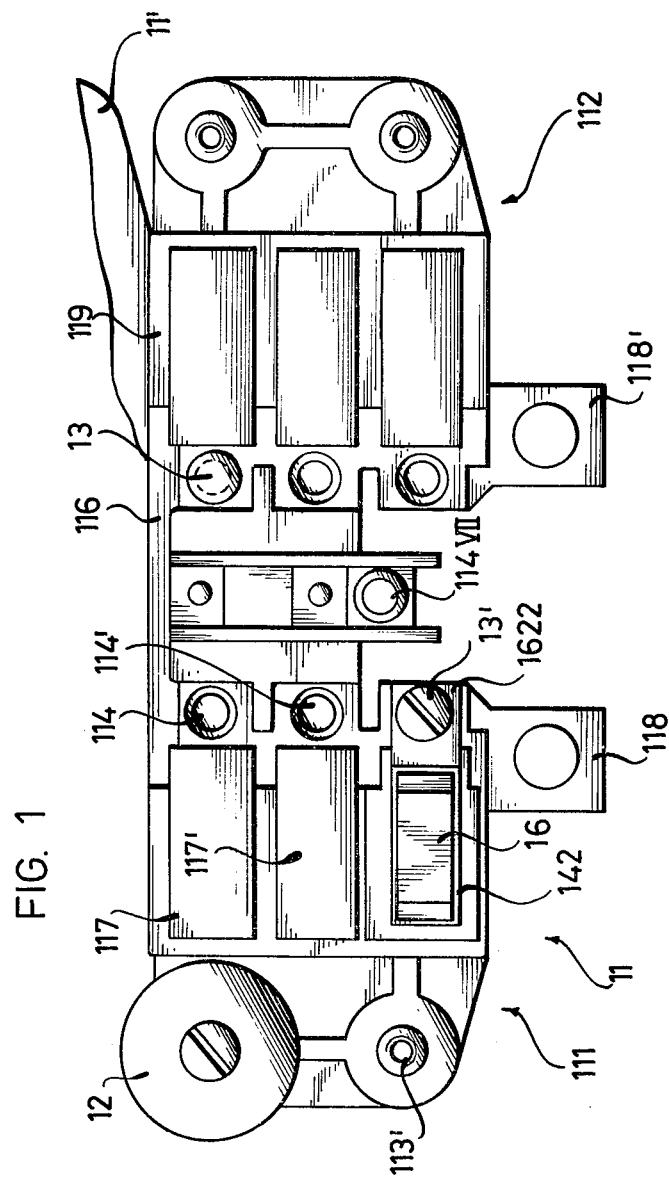
FIG. 1 shows a side view of the basic unit.
Figure 2:
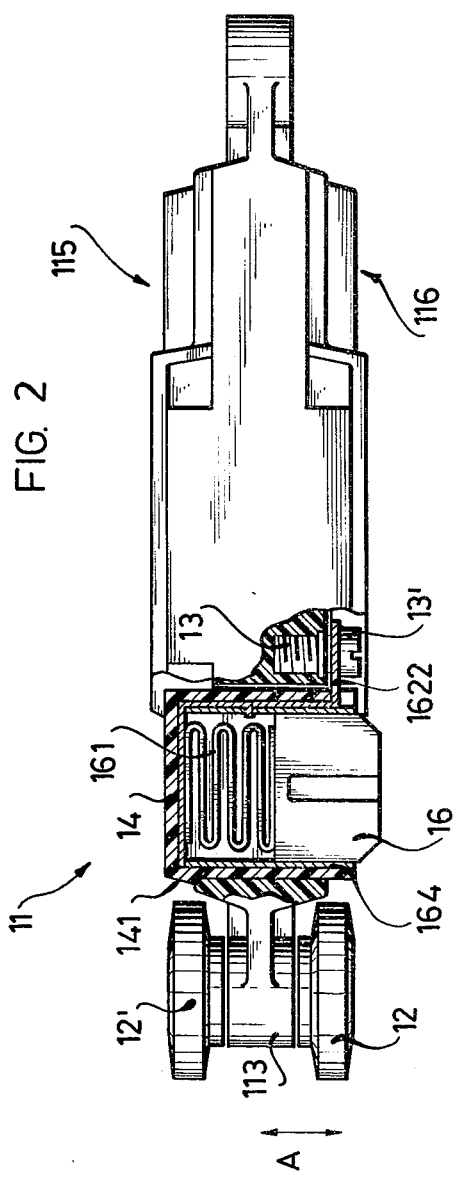
FIG. 2 shows a top view of the basic unit, partially in section.
Figure 4:
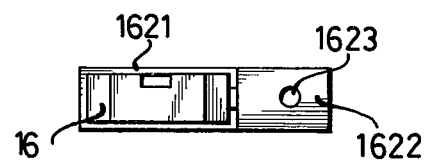
FIG. 4 shows a front view of the sliding contact arrangement.
Figure 3:
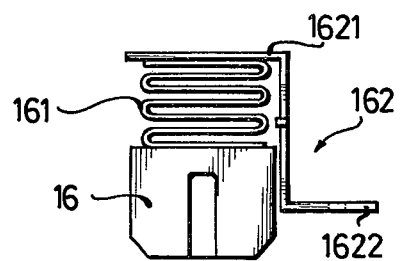
FIG. 3 shows a side view of the sliding contact arrangement.
Figure 5:
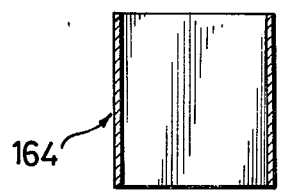
FIG. 5 shows a section through an intermediate sleeve.
Figure 6:
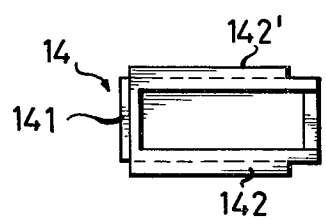
FIG. 6 shows a section through the cassette for holding the sliding contact.
Figure 7:
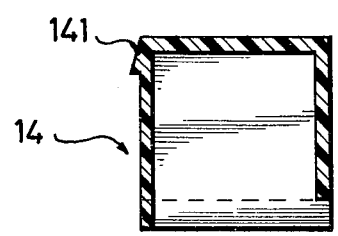
FIG. 7 shows a front view of the cassette.
Figure 9:
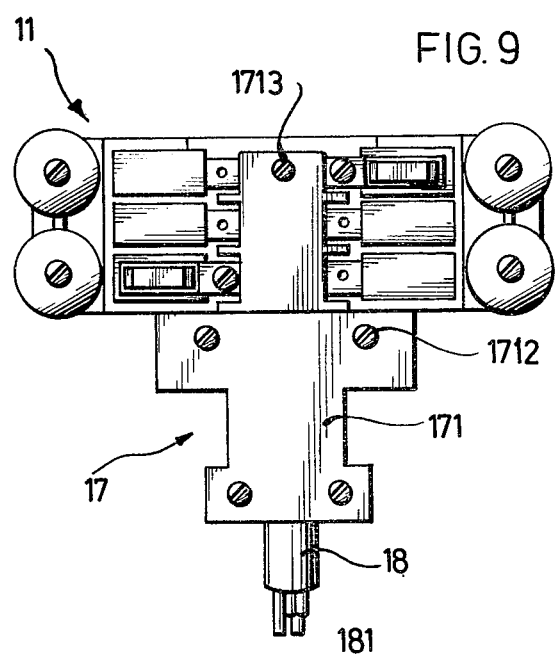
FIG. 9 shows a side view of the collector shoe with its cover attached (FIGS. 8 and 9 are at a reduced scale).
Figure 8:
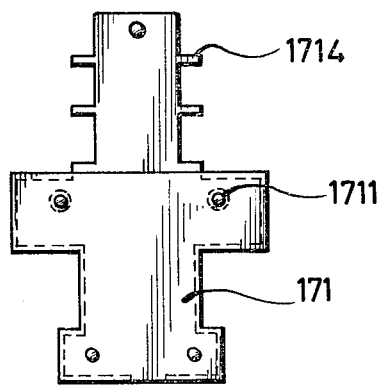
FIG. 8 shows a view of the cover to be associated with the collector shoe and forming the guide member.

The shoe consists of the basic unit 11 with bearing surfaces 113, 113'. . . formed on the face sides 111 and 112 for the rollers 12, 12' with recesses 114, 114' into which threaded bolts 13 are part of terminals 13/13', with breakouts 117, 117' extending between the lengthwise sides.

Cassettes 14 can be inserted into the breakouts 117, 117' lying at the level of terminals 13/13' from either side (115 or 116) of the basic unit 11. These cassettes are fixed in basic unit 11 by projection 141, 142 and 142' contacting lengthwise sides 115 and 116.

The sliding contacts 16 to be inserted in the cassettes 14 are fastened to a compression spring 161 which is arranged on a leg 1621 of a Z-shaped sheet metal member 162 whose other leg 1622 with hole 1623 is fixed with a wire 181 of cable 18 by the terminal screw 13', covering the threaded bolt 13 of terminals 13/13'. A brass sleeve 164 assures the unimpaired mobility (double arrow A) of the sliding contact 16 in the cassette 14.

Evidently a multiplicity of different sliding contact arrangements is possible. Via the head of the collector shoe, a sliding contact, as a rule for the ground strap, may be provided for which connection $114^{VII}$ is available. Furthermore, the system is expandable by stacking. It is only necessary to mill off the bearing surfaces 118, 118' from the element 11' to be placed on top and to connect the top element 11' to the bottom element 11.

The bearing surfaces 118, 118' on the bottom side of the basic unit 11 are used for fixing the covers 171 for the cable ducts; these covers project downward beyond the basic unit 11 and form the guide member 17 of the current collector shoe. The cable ducts are threaded at lugs 1711 into bearing surfaces 118, 118' (1712) and screw-mounted (1713) on the basic unit. Lugs 1714 formed on the covers 171 increase the surface leakage path.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A current collector shoe traveling along a multipole slide wire comprising: sliding contacts projecting sideways, breakout means on lengthwise sides of said shoe, cassettes insertable from either sides, said sliding contacts being spring mounted in said cassettes.

2. A current collector shoe as defined in claim 1 wherein said cassettes are of non-conducting material.

3. A current collector shoe as defined in claim 2 including a brass sleeve inserted between each of said cassettes and said sliding contacts.

4. A current collector shoe as defined in claim 1 wherein said cassettes are detachably detented in said collector shoe.

5. A current collector shoe as defined in claim 1 including projections formed on face sides of cassettes and contacting said collector shoe from the outside when installed.

6. A current collector shoe as defined in claim 1 including at least one compression spring engaging one of said sliding contacts, said spring being rigidly connected to said sliding contact, a Z-shaped sheet metal member having a leg fastened to a free end of said compression spring, said Z-shaped sheet metal member contacting the bottom of said cassette, an opposite leg of said Z-shaped sheet metal member being fastened from the outside to said collector shoe.

7. A current collector shoe as defined in claim 6 wherein said compression spring is a flat strip compression spring.

8. A current collector shoe as defined in claim 6 including terminals having screw means for cores of a supply cable, said terminals being at the level of said breakout means, and said opposite leg of said Z-shaped sheet metal member being fixed by said screw means.

9. A current collector shoe as defined in claim 1 including covers for cable ducts, said covers being detachably fastened to said collector shoe.

10. A current collector shoe as defined in claim 9 wherein said covers project downward beyond said collector shoe and form a guide member and pickup of said collector shoe.

11. A current collector shoe as defined in claim 10 wherein said covers are fixable by fastening means to said collector shoe.

12. A current collector shoe as defined in claim 9 including projections formed on said covers, and recesses for receiving said projections.

* * * * *